United States Patent [19]

Mashburn et al.

[11] Patent Number: 6,045,109
[45] Date of Patent: Apr. 4, 2000

[54] ROD HOLDER RETENTION DEVICE

[76] Inventors: James S. Mashburn; Jerry P. Mashburn, both of 1201 E. Hill St., Long Beach, Calif. 90806

[21] Appl. No.: 09/004,624

[22] Filed: Jan. 8, 1998

[51] Int. Cl.[7] ............ F16M 13/00; A01K 97/10; A01K 91/00; F16B 13/04

[52] U.S. Cl. ............ 248/511; 43/21.2; 43/27.4; 411/75

[58] Field of Search ............ 248/538, 511, 248/532, 231.21, 231.9; 43/21.2; 74/551.1–551.6; 114/364, 255, 343; 411/71–72, 75–80

[56] References Cited

U.S. PATENT DOCUMENTS

| | | | |
|---|---|---|---|
| 612,489 | 10/1898 | Dean | 411/80 |
| 737,555 | 8/1903 | Dorn | 411/79 |
| 741,563 | 10/1903 | Stevens | 411/79 |
| 1,964,427 | 6/1934 | Chandler | 411/76 |
| 2,051,251 | 8/1936 | Epstein | 16/38 |
| 2,177,138 | 10/1939 | Hollander | 411/79 |
| 3,222,873 | 12/1965 | Williams | 52/698 |
| 4,706,437 | 11/1987 | Boecker, Jr. | 52/698 |
| 4,778,141 | 10/1988 | Bogar | 248/538 |
| 5,118,061 | 6/1992 | Byrne et al. | 248/231.9 |
| 5,197,349 | 3/1993 | Herman | 74/551.1 |
| 5,241,881 | 9/1993 | Chen | 74/551.2 |
| 5,509,328 | 4/1996 | Lai | 74/551.3 |
| 5,842,385 | 12/1998 | Su | 74/551.3 |

*Primary Examiner*—Anita M. King
*Assistant Examiner*—Michael Nornberg
*Attorney, Agent, or Firm*—Fulwider Patton Lee & Utecht, LLP

[57] ABSTRACT

A device designed for temporarily mounting an object to a tubular rod holder. The device consists of a pair of engagement sleeves, each having an inclined plane defining one end. The engagement sleeves are oriented such that the inclined planes complementarily engage one another. A rod extends axially through the engagement sleeves, being fixed to one of the engagement sleeves and extending beyond the end of the other engagement sleeves for supporting an object. When a nut is tightened to force the two engagement sleeves against one another, the inclined planes cause the cylinder to shift laterally and firmly engage the inner wall of the tubular rod holder.

10 Claims, 2 Drawing Sheets

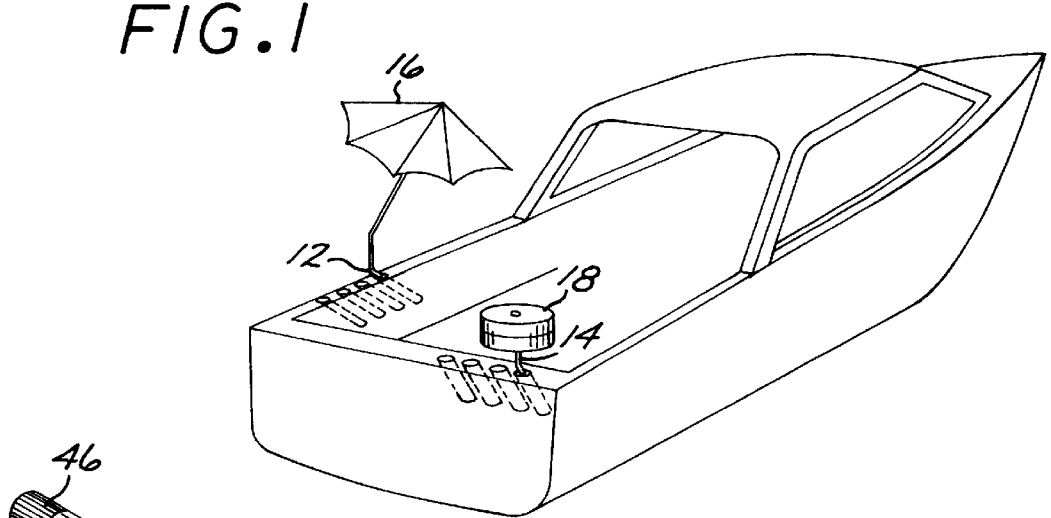
FIG. 1
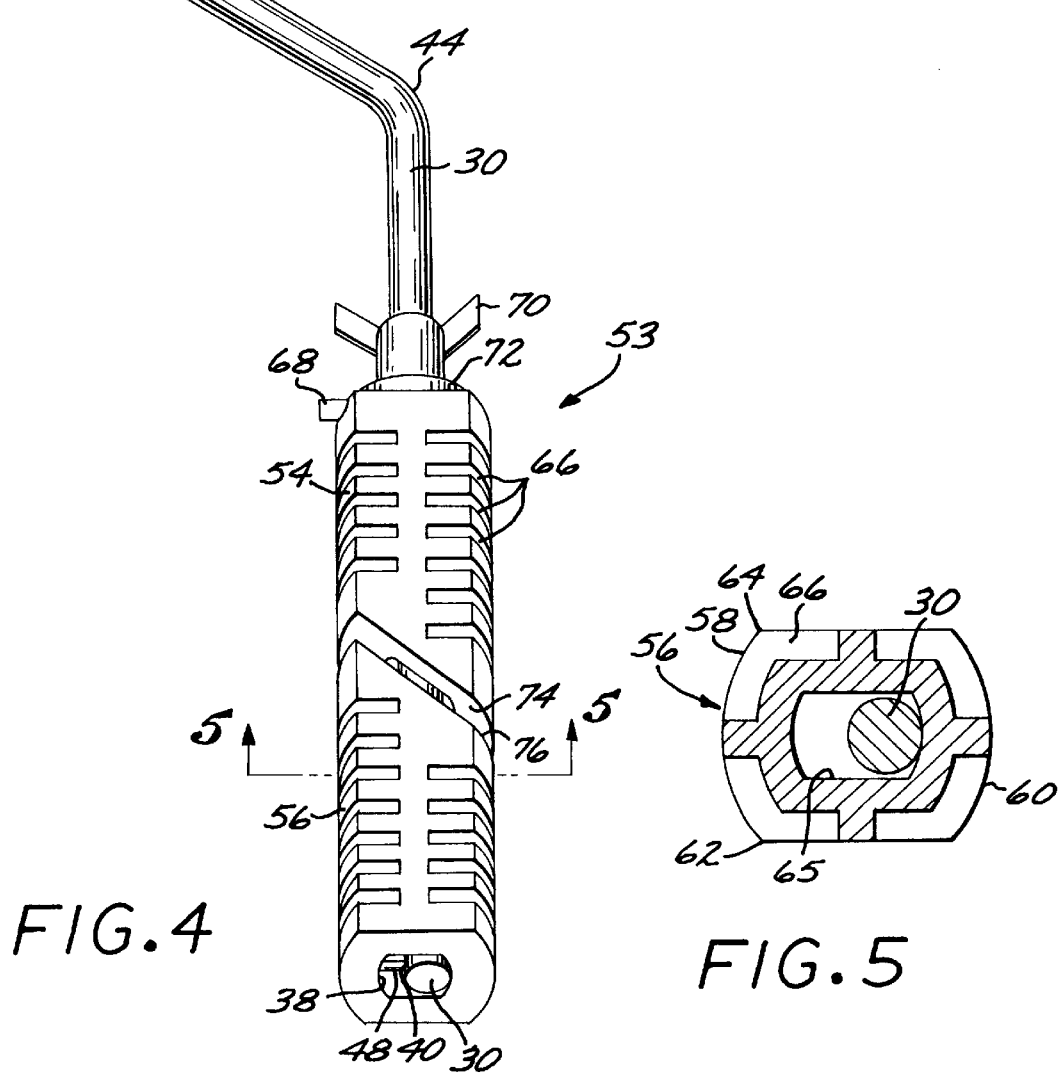
FIG. 4
FIG. 5

ROD HOLDER RETENTION DEVICE

BACKGROUND OF THE INVENTION

1. Field of the Invention

The present invention relates to devices used to support an object from a fishing rod holder such as that found on various watercraft. More particularly, the invention pertains to a device for quickly and easily securing, for example, a barbeque to such rod holder.

2. Description of the Prior Art

Many pleasure boats are equipped with fishing rod holders which consist essentially of a cylinder oriented at an angle and mounted flush with the top of the transom or gunwale of the boat. Some rod holders have a diametrically disposed cross pin disposed therein to define their lower ends. A fishing rod is simply inserted into the holder so as to be held substantially upright while trolling. It is often desirable to be able to also use such holders to support items such as barbeques, fileting tables or umbrellas.

One device which has been used for supporting objects other than fishing rods in a rod holder consists of a generally cylindrically shaped device having rubber rings at either end and being dimensioned for sliding receipt within a rod holder. When the device is compressed axially, the rubber rings are caused to expand radially and thereby engage the inner wall of the tube holder. A device of this type can effectively hold some objects and can be relatively easily installed and removed, however, since the radial expansion of the rubber rings is limited, such a device can only be used on a rod holder having a very specific inner diameter. In addition, the rubber rings are susceptible to deterioration such as cracking and hardening, limiting the service life of such a device.

Another device which has been employed consists of a tube having an "L" shaped groove in its bottom and a downward tapered sleeve above which is disposed a nut for forcing the tapered sleeve downward. This device is designed to be used with a rod holder having a diametrically extending cross pin defining its bottom. In use, this device is inserted into a rod holder so that the cross pin at the bottom of the rod holder fits into the "L" shaped slot at the bottom of the device. The device is then twisted so that the cross pin will engage the "L" shaped slot, preventing the device from moving axially out of the rod holder. The nut above the tapered sleeve is then tightened, forcing the sleeve into engagement with the rod holder. While such a device can securely hold an object, its use is limited to a rod holder having a pin across its bottom. Furthermore, the orientation of such a device is limited by the orientation of the cross pin so that if the pin is not correctly oriented in the particular rod holder being used, the device will not be capable of being correctly oriented for supporting an object. Finally the depth to which the device must be inserted into the rod holder is therefore dictated by the rod holder.

Still other devices have been used which simply fit relatively loosely within a rod holder. Such devices generally have a slot formed at the bottom for receiving a cross pin at the bottom of the rod holder. While the interaction of the slot with the pin may serve to rotationally lock the device in place, devices of this type do not provide a means for longitudinally securing the device and, therefore, do not provide adequate support for many situations.

It is therefore apparent that there remains a need for a device which is positively securable within a rod holder, which can be quickly and easily installed and removed from the rod holder and which requires no modification of the rod holder. Further, such device should be useable without the need for a cross pin within the rod holder as such pin may not be fitted to the rod or may be located at an inordinate depth therein or may not be advantageously rotationally oriented therein. There is also a need for a device which can be used with rod holders of various diameters.

SUMMARY OF THE INVENTION

Briefly and in general terms, the present invention provides a device which can be inserted into a rod holder of a boat and securely held therein at any rotational orientation, independent of the bottom configuration of the rod holder, to thereby enable an object to be positively supported therefrom. The device can be easily and quickly installed and can be just as quickly and easily removed without any modification or damage to the rod holder.

The device achieves this function by use of two coaxially aligned, substantially cylindrical engagement sleeves, each being truncated to define a similarly inclined plane at one end and oriented such that the inclined planes face each other and are complementarily arranged. The engagement sleeves are dimensioned for sliding receipt within the rod holder and each has a bore formed along its central axis. A threaded rod extends axially through the center of the two engagement sleeves and is dimensioned to permit lateral movement therein. The rod is attached to the distal end of one of the engagement sleeves so as to be fixed axially while being free to move laterally and pivotally therein.

Threaded onto the rod and disposed adjacent the proximal end of the first engagement sleeve is a nut. By tightening the nut while the device is received within a rod holder, the two engagement sleeves are forced against one another. Interaction of the two inclined planes causes the two engagement sleeves to move laterally. The rod's pivotal and lateral freedom of movement within the engagement sleeves allows the outer surface of the engagement sleeves to firmly engage the inner wall of the rod holder within a fairly wide range of diameters. In the most preferred embodiment, the engagement sleeves have a squared off oval cross-section which maximizes grip and provides for an especially wide service range. A stop element projecting radially from near the proximal end of the proximal engagement sleeve may additionally be fitted to limit the depth to which the device can be inserted into a rod holder. The proximal end of the rod extends outwardly from the rod holder and can be used to support an object such as a barbeque, umbrella or fileting table.

These and other features and advantages of the present invention will become apparent from the following detailed description of preferred embodiments which taken in conjunction with the accompanying drawings illustrate, by way of example, the features of the invention.

DESCRIPTION OF THE DRAWINGS

FIG. 1 a perspective view of rod holder retention devices of the present invention in use on a boat;

FIG. 4 is a perspective view of the most preferred embodiment; and

FIG. 5 is an enlarged cross-sectional view taken along lines 5—5 of FIG. 4.

DESCRIPTION OF THE PREFERRED EMBODIMENTS

Figure 2:
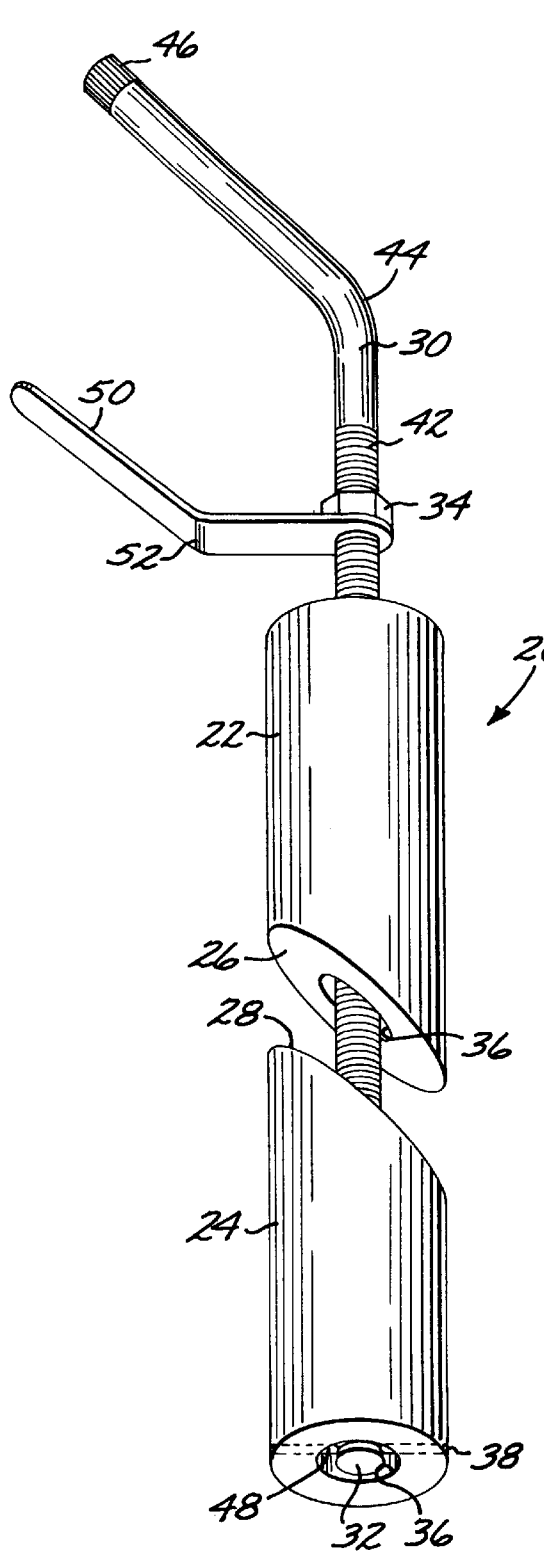
FIG. 2 is a perspective view showing the rod holder retention device of the present invention.
Figure 3:
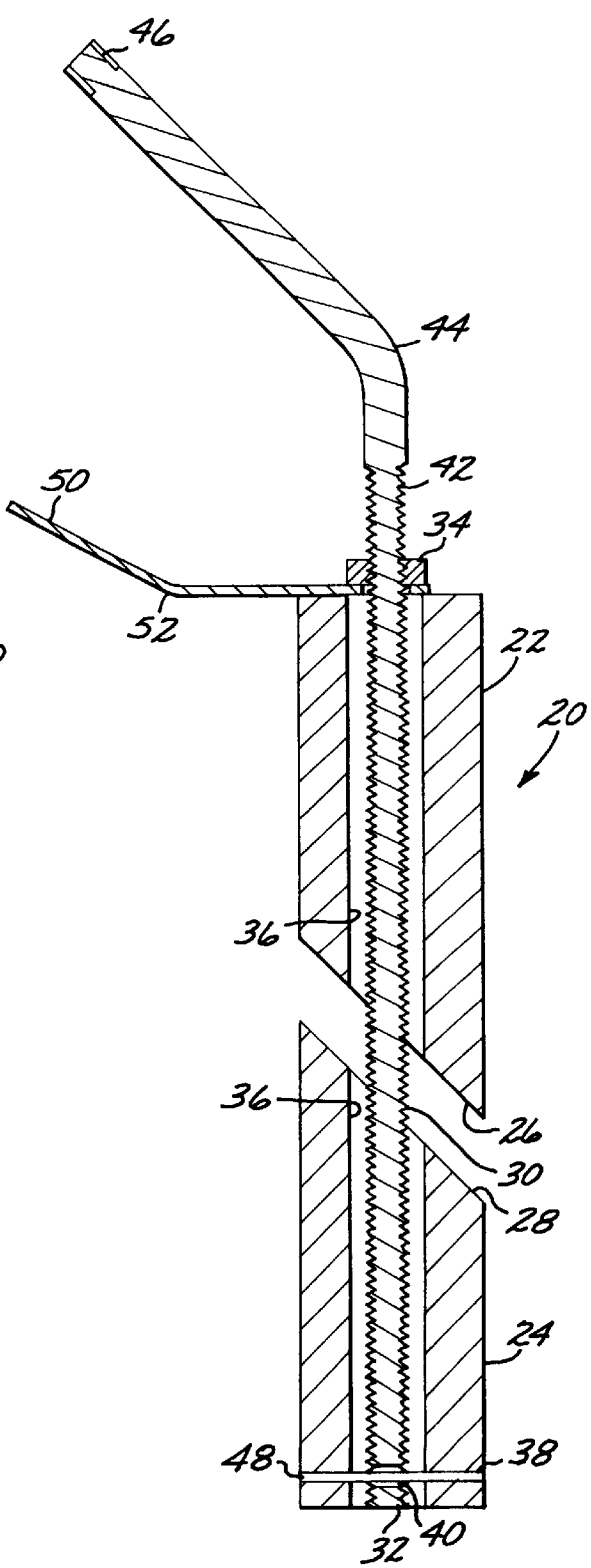
FIG. 3 is across sectional view, of the retention device.

In the following detailed description, like reference numerals are used to refer to like or corresponding elements in the different figures of the drawings. The rod holder device of the present invention is embodied in a device to be received within a typical rod holder installed on many watercraft for the purpose of supporting fishing rods, to conveniently and securely support objects such as a barbeque, umbrella, or fileting table therefrom. FIG. 1 illustrates two devices 12, 14 in use on a boat, one supporting an umbrella 16 from one of the rod holders disposed in the gunwale and a second device supporting a barbeque 18 from one of the rod holders disposed in the boat's transom.

With reference to FIG. 2, the device 20 comprises a first engagement sleeve 22 and a second engagement sleeve 24 having abutting inclined planes 26, 28, and a rod 30 extending axially therethrough. The rod is joined at its distal end 32 to the second engagement sleeve 24 near its distal end while a tightening nut 34, threaded onto the rod, is disposed adjacent the proximal end of the first engagement sleeve 22.

Each of the engagement sleeves shown are circular in cross-section. The proximal end of the second engagement sleeve 24 and the distal end of the first engagement sleeve 22 are truncated so as to form planes inclined at similar angles, nominally 45°. Both engagement sleeves have bores 36 formed therein extending axially there through while the second engagement sleeve additionally has a diametrically disposed pin receiving bore 38 formed therein near its distal end. The pin receiving bore is oriented to define an axis perpendicular to an axis parallel to the inclined plane 28 of the second engagement sleeve 24.

The rod 30 has an anchor hole 40 formed therein extending diametrically therethrough near its distal end 32. The diameter of the anchor hole is slightly larger than that of the pin receiving bore 38 of the second engagement sleeve 24. The rod 30 is of substantially smaller diameter than the axial bores 36 of the first and second engagement sleeves 22 and 24 and is threaded 42 from its distal end to a point beyond the proximal end of the second engagement sleeve. The rod is formed with a bend 44 therein to enable a substantially vertical orientation to be achieved when inserted in an angled rod holder. The rod is further formed at its top or proximal end with a splined surface 46 to facilitate positive attachment to the object to be supported.

The rod is held in an axially fixed relationship within the axial bore 36 of the second engagement sleeve 24 by a pin 48. The pin is retained by an interference fit within the pin receiving bore 38 of the second engagement sleeve 24 while passing through the anchor bore 40 of the rod 30 in loose fitting relationship. In this way the rod can slide upon and pivot about the pin 48, allowing the rod to move laterally and angularly within the axial bore 36 of the second engagement sleeve 24 while being substantially fixed in the axial direction.

Threaded onto the threaded portion 42 of the rod 30 is a tightening nut 34, disposed adjacent the proximal end of the first engagement sleeve 22. The tightening nut is provided with a handle 50, extending radially therefrom, which facilitates manual turning of the nut. The handle is angled 52 toward the proximal end of the rod so that when the device is placed within an angled rod holder and the nut is turned, the handle will not interfere with the transom or gunwale surface adjacent the rod holder.

It will be apparent to those skilled in the art that the nut 34 and threaded rod 30, 42 combination can be replaced by any of a number of equivalent means for forcing the first and second engagement sleeves 22 and 24 together. For example rather than providing a nut and a threaded rod, a ratchet mechanism can be employed with a rod having teeth to engage the ratchet device. Similarly, an eccentric cam device can be used with a rod having no teeth or threads. Such a ratchet or eccentric cam device could be attached to the first engagement sleeve or could be a separate unit, sliding upon the rod.

The most preferred embodiment 53 of the present invention is illustrated in FIGS. 4 and 5. In such embodiment, the engagement sleeves 54, 56 have a squared off oval cross-section wherein the radius of curvature of the rounded surfaces 58, 60 selected to exceed the radius of the typical rod holder, Such configuration ensures that the interior surface of the rod holder is contacted by each engagement sleeve at two points 62, 64 or lines extending along the length of the sleeves rather than the single point or line achieved by an engagement sleeve of circular cross-section.

The central bore 65 extending axially through the engagement sleeves is oval in cross-section. The engagement sleeves have grooves or hollows 66 formed therein to decrease the amount of material required for their manufacture. A stop element 68 is fitted near the proximal end of the proximal engagement sleeve 54 to limit the depth to which the device 53 can be inserted into a rod holder. A large wing nut 70 and washer 72 facilitates the tightening of the device within a rod holder.

In constructing the most preferred embodiment, it will be appreciated by those skilled in the art that the rod 30, pin 48 and washer 72 are preferably constructed of a corrosion resistant metal such as stainless steel to withstand the conditions a watercraft is typically subjected to. The rod is preferably formed of stainless steel stock, approximately ½ inch in diameter, onto which the threads 42 can be formed using a thread tapping machine extending from the distal end of the rod to a point just short of where the bend 44 is to be formed. The anchor hole 40 can be formed by a drill press. The desired angle will then be formed by bending the rod.

The first and second engagement sleeves 54 and 56 are preferably constructed of a plastic such as ABS. ABS in not only inexpensive and readily moldable but does not corrode and facilitates the gripping of the inner wall of the rod holder without damaging it. The two elements may be injection molded as a single piece after which a diagonal cut is made to form the inclined planes 74, 76. Alternatively, each sleeve may be individually injection molded after which the inclined plane is machined to ensure that a flat, properly angled surface is achieved. The wing nut is similarly formed of injection molded ABS.

To assemble the device 53, the wing nut 70 must first be threaded onto the rod 30 from its distal end, after which the washer 72 is fitted. The first engagement sleeve 54 will then be received onto the rod with its inclined plane 74 oriented in the distal direction. The second engagement sleeve 56 will then be received onto the rod with its inclined plane 76 oriented in the proximal direction. The pin 48 is then forced into the anchor pin engagement bore 38 of the second engagement sleeve to extend through the pin anchor bore 40 in the rod 30 and into the pin engagement bore 38 on the other side to thereby securely attach the second engagement sleeve to the rod.

In use the first and second engagement sleeves 22, 24, 54, 56 will be inserted into a rod holder 12, 14, and the proximal end of the rod held in the desired rotational orientation. The tightening nut 34, 70 will then be turned to force the first engagement sleeve 22, 54 against the second engagement sleeve 24, 56 so that the inclined planes 26, 28, 74, 76 will slide upon one another, causing the engagement sleeves to move laterally to thereby firmly engage the inside of the rod holder. The rod 30, being securely fixed to the second engagement sleeve and extending outwardly from the distal end of the first engagement sleeve, will then be securely fixed within the rod holder for supporting an object at its proximal end. To remove the device, the nut is simply loosened so that the engagement sleeves become disengaged from the inner wall of the rod holder allowing the device to be withdrawn.

While a particular form of the invention has been illustrated and described, it will also be apparent to those skilled in the art that various modifications can be made without departing from the spirit and scope of the invention. More particularly, the means for forcing the first and second engagement sleeves together can be accomplished by various devices, and the proximal end of the rod can be configured in a variety of forms for attachment to an object. Accordingly, it is not intended that the invention be limited except by the appended claims.

What is claimed is:

1. A device for supporting an object from a tubular rod holder, comprising:

a first engagement sleeve dimensioned for sliding receipt within a tubular rod holder, having an inclined plane formed on its distal end and having an axially extending bore formed therethrough;

a second engagement sleeve dimensioned for sliding receipt within such tubular rod holder, having an inclined plane formed on its proximal end, and having an axially extending bore formed therethrough, wherein said second sleeve is oriented such that its inclined plane is complementarily positioned relative to the inclined plane of said first sleeve;

a rod axially extending through said first and second sleeves, wherein said rod has a diameter selected to loosely fit within said axially extending bores and wherein said rod is attached to said second sleeve near its distal end so as to be axially fixed yet radially shiftable relative thereto; and means for forcing said first and second sleeves against one another whereby the inclined planes cause said sleeves to shift laterally and engage said rod holder.

2. The device of claim 1 wherein:

said rod extends outwardly from said first engagement sleeve and is formed to facilitate the mounting of any object thereon.

3. The device of claim 1 wherein said first and second engagement sleeves are circular in cross-section.

4. The device of claim 1 wherein said first and second engagement sleeves have a cross-sectional shape such that contact with a cylindrical rod holder in which such sleeves' are inserted would occur at multiple points about said sleeves' circumference.

5. The device of claim 4 wherein said first and second engagement sleeves have a cross-section defining a truncated oval.

6. The device of claim 5 wherein said truncated oval has at least one curved surface formed thereon having a radius of curvature less than the radius of said rod holder.

7. The device of claim 1, further comprising a pin radially received through said second engagement sleeve and said rod, so as to fix said rod axially yet allow it to shift along said pin.

8. The device of claim 1 wherein said axially extending bores are oval in cross-section.

9. The device of claim 1, wherein:

said first and second engagement sleeves are constructed of a plastic.

10. A device for supporting an object from a tubular rod holder, comprising:

an engagement sleeve dimensioned for sliding receipt within a tubular rod holder, severed angularly to form a proximal component and a distal component, said sleeve having an axial bore formed therein;

a rod, received within said axial bore, axially fixed to the distal end of said engagement sleeve and radially shiftable relative thereto and extending proximally from said engagement sleeve, said rod having a threaded surface formed thereon; and a nut, threaded onto said rod adjacent the proximal end of said engagement sleeve for axially compressing said engagement sleeve.

* * * * *